(12) United States Patent
Yeo et al.

(10) Patent No.: US 9,882,707 B1
(45) Date of Patent: Jan. 30, 2018

(54) SYSTEM AND METHOD FOR CHARACTERIZING A RECEIVER OF A COMMUNICATION SIGNAL

(71) Applicant: Xilinx, Inc., San Jose, CA (US)

(72) Inventors: Si Hui Yeo, Singapore (SG); Chong Ling Khoo, Singapore (SG); Yoon Yin Lee, Singapore (SG); Fang Suey Khor, San Jose, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 15/468,794

(22) Filed: Mar. 24, 2017

(51) Int. Cl.
*H04L 7/00* (2006.01)
*H04L 7/033* (2006.01)
*H04L 5/00* (2006.01)
*H04L 12/26* (2006.01)

(52) U.S. Cl.
CPC .............. *H04L 7/033* (2013.01); *H04L 5/006* (2013.01); *H04L 43/087* (2013.01)

(58) Field of Classification Search
CPC ........ H04L 7/033; H04L 5/006; H04L 43/087
See application file for complete search history.

(56) References Cited

U.S. PATENT DOCUMENTS

| | | | |
|---|---|---|---|
| 8,917,803 B1 * | 12/2014 | Asuncion | H04L 7/033 375/229 |
| 8,995,514 B1 | 3/2015 | Asuncion et al. | |
| 9,363,046 B1 * | 6/2016 | Saed | H04L 1/24 |
| 2011/0311009 A1 * | 12/2011 | Flynn | G01R 13/0218 375/354 |
| 2016/0072650 A1 * | 3/2016 | Mobin | H04L 25/0278 375/219 |
| 2017/0214557 A1 * | 7/2017 | Hoang | H04L 25/03 |

* cited by examiner

*Primary Examiner* — Dac Ha
(74) *Attorney, Agent, or Firm* — David O'Brien

(57) ABSTRACT

An integrated circuit (IC) includes a sampling circuit configured to sample a first signal based on a sampling position signal received from an eye-scan controller to generate a sequence of sampled symbols. A data checker is configured to provide an error signal including an indication of errors in the sequence of sampled symbols to the eye-scan controller. The eye-scan controller is configured to sweep from an initial position of a unit interval (UI) of the first signal to a left sweep end to generate a first sequence of sampling positions and sweep from the initial position to a right sweep end to generate a second sequence of sampling positions. The left and right sweep ends are determined based on first and second sequences of bit error rate (BERs) corresponding to the first and second sequences of sampling positions respectively.

20 Claims, 10 Drawing Sheets

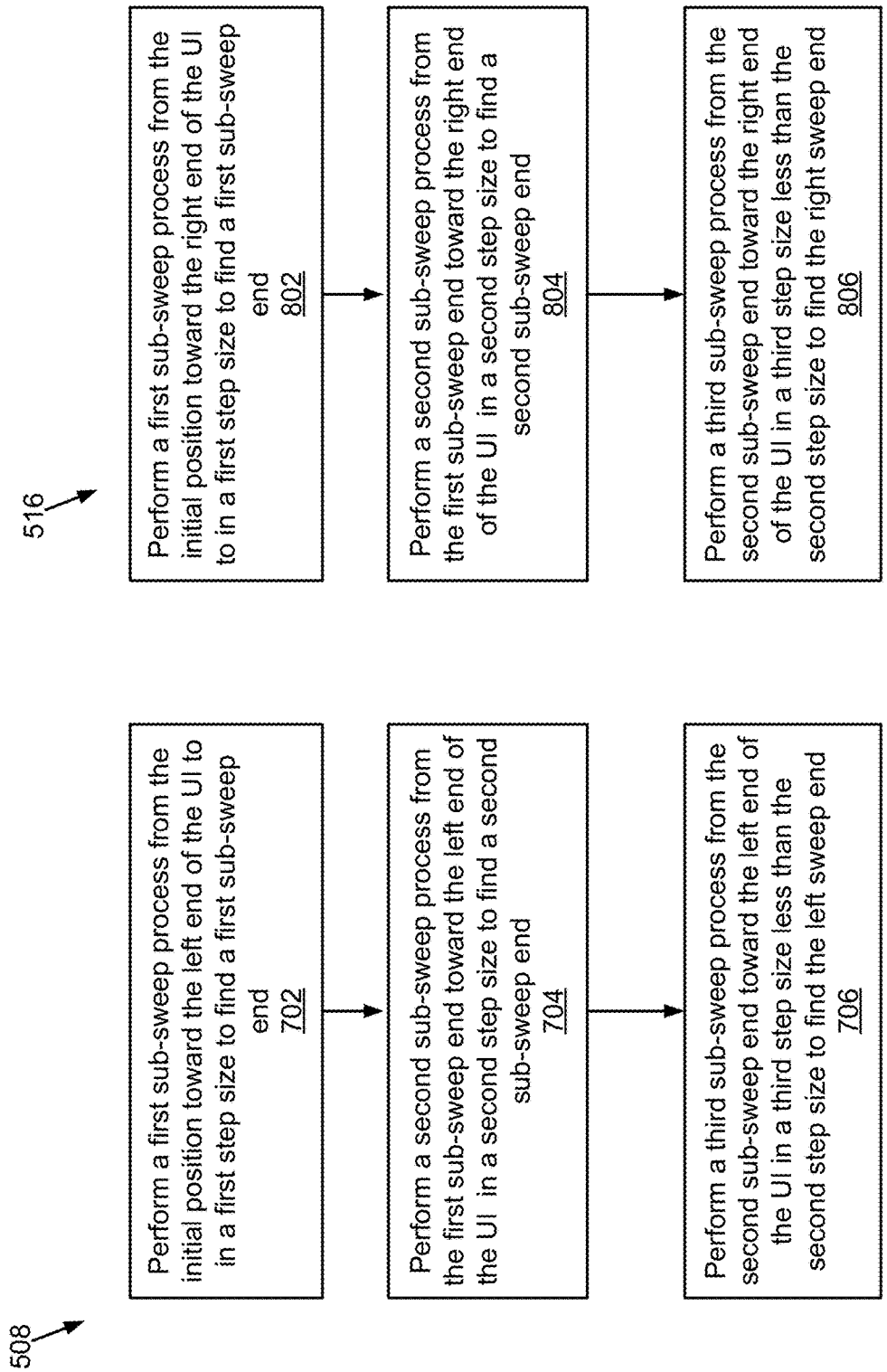

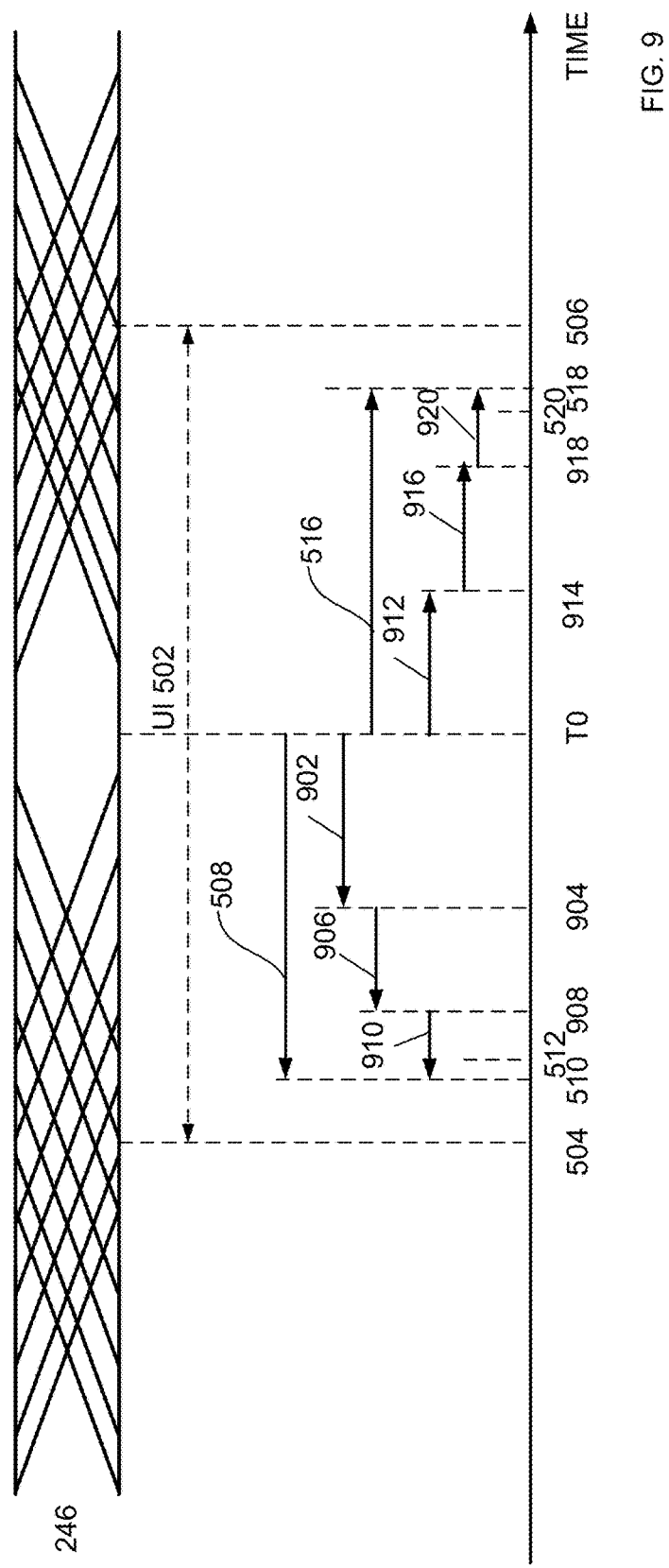

SYSTEM AND METHOD FOR CHARACTERIZING A RECEIVER OF A COMMUNICATION SIGNAL

TECHNICAL FIELD

Examples of the present disclosure generally relate to integrated circuits ("ICs") and, in particular, to an embodiment related to characterizing a receiver of a data communication in ICs.

BACKGROUND

A receiver may sample incoming data symbols at some phase of a sampling clock generated by a phase-locked loop (PLL). The PLL uses a reference clock to produce the sampling clock. The edge transitions between incoming data symbols may be recovered using the sampling clock. To properly sample the incoming data symbols, the receiver needs to sample the incoming data symbols at a sampling phase, also referred to as a sampling position, between the edge transitions in the stream of incoming data symbols. The range of sampling positions for which the receiver properly recovers the incoming data symbols gives the margin for the sampling position.

To check the margin of the sampling position, external test equipment may inject jitter into the signal sent to the receiver. The range of magnitudes of the injected jitter for which the receiver properly recovers the data symbols may give the margin of the sampling position. To check that the data symbols actually captured by the receiver match the data symbols that the external test equipment transmits to the receiver, the captured data symbols need to be looped back to the external test equipment. It is time-consuming and difficult to determine the margin of the sampling position because external test equipment is required and because the tested receiver must generally include a transmitter supporting a loopback mode for returning the actually captured data symbols back to the external test equipment.

Accordingly, it would be desirable and useful to provide an improved way of characterizing receivers.

SUMMARY

In some embodiments in accordance with the present disclosure, an integrated circuit (IC) includes a sampling circuit configured to receive, from an eye-scan controller, a sampling position signal and sample a first signal based on the sampling position signal to generate a sequence of sampled symbols; a data checker configured to provide, to the eye-scan controller, an error signal including an indication of one or more errors in the sequence of sampled symbols; and the eye-scan controller configured to perform a left sweep process to sweep toward a left end of a unit interval of the first signal from an initial position to a left sweep end to generate a first sequence of sampling positions for the sampling position signal, wherein the left sweep end is determined based on a first sequence of BERs corresponding to the first sequence of sampling positions; and perform a right sweep process to sweep toward a right end of the unit interval from the initial position to a right sweep end to generate a second sequence of sampling positions for the sampling position signal, wherein the right sweep end is determined based on a second sequence of BERs corresponding to the second sequence of sampling positions.

In some embodiments, the eye-scan controller is further configured to determine the left sweep end based on a first determination that a difference between last two BERs of the first sequence of BERs is less than a first BER difference threshold.

In some embodiments, the eye-scan controller is further configured to perform a first sub-sweep process to generate a first portion of the first sequence of sampling positions and a first portion of the first sequence of BERs by sweeping at least a portion between the initial position and a first sub-sweep end in a first step size; and perform a second sub-sweep process to generate a second portion of the first sequence of sampling positions and a second portion of the first sequence of BERs by sweeping from the first sub-sweep end to the left sweep end in a second step size different from the first step size.

In some embodiments, the second step size is less than the first step size.

In some embodiments, the eye-scan controller is further configured to determine the first sub-sweep end in response to a second determination that a difference of last two BERs of the first portion of the first sequence of BERs is less than a second BER difference threshold.

In some embodiments, the second BER difference threshold is greater than the first BER difference threshold.

In some embodiments, the eye-scan controller is further configured to prior to performing the first sub-sweep process, perform a third sub-sweep process to generate a third portion of the first sequence of sampling positions and a third portion of the first sequence of BERs by sweeping from the initial position to a third sub-sweep end located between the initial position and the first sub-sweep end, wherein the third sub-sweep end is determined in response to detecting a first BER in the third portion of the first sequence of BERs that is greater than zero, and wherein the first sub-sweep process sweeps from the third sub-sweep end to the first sub-sweep end.

In some embodiments, the IC includes a pseudorandom binary sequence (PRBS) generator configured to generate a sequence of pseudorandom binary symbols; and a receiver configured to receive, through an input of the IC, the sequence of pseudorandom binary symbols and generate the first signal based on the received sequence of pseudorandom binary symbols; wherein the data checker is configured to generate the error signal by comparing the sequence of sampled symbols with the sequence of pseudorandom binary symbols.

In some embodiments, the eye-scan controller is further configured to generate one or more measurements of the first signal based on the first sequence of sampling positions and the second sequence of sampling positions and corresponding BERs.

In some embodiments, the eye-scan controller is further configured to generate one or more measurements of the first signal without using an oscilloscope located in a second IC different from the IC that includes the sampling circuit.

In some embodiments, the sampling circuit is configured to receive, from the eye-scan controller, a sampling amplitude signal and sample the first signal based on the sampling amplitude signal, and wherein the eye-scan controller is configured to sweep vertically across an eye diagram associated with the first signal to generate a plurality of sampling amplitudes; and perform the left sweep process and the right sweep process for each sampling amplitude of the plurality of sampling amplitudes.

In some embodiments in accordance with the present disclosure, a method includes providing, by a receiver circuit included in a first integrated circuit (IC), a first signal; determining, by an eye-scan controller included in the first IC, an initial position of a unit interval associated with the first signal; performing, by the eye-scan controller, a left sweep process, the left sweep process including: sweeping toward a left end of the unit interval from the initial position to a left sweep end to generate a first sequence of sampling positions; sampling the first signal based on the first sequence of sampling positions to generate a sampled symbol signal; generating a first sequence of bit error rates (BERs) corresponding to the first sequence of sampling positions based on the sampled symbol signal; and determining the left sweep end based on the first sequence of BERs; performing, by the eye-scan controller, a right sweep process, the right sweep process including sweeping toward a right end of the unit interval from the initial position to a right sweep end to generate a second sequence of sampling positions; sampling the first signal based on the second sequence of sampling positions to generate the sampled symbol signal; generating a second sequence of BERs corresponding to the second sequence of sampling positions using the sampled symbol signal; and determining the second sweep end based on the second sequence of BERs.

In some embodiments, the performing the left sweep process includes determining the left sweep end based on a first determination that a difference between last two BERs of the first sequence of BERs is less than a first BER difference threshold.

In some embodiments, the performing the left sweep process includes performing a first sub-sweep process to generate a first portion of the first sequence of sampling positions and a first portion of the first sequence of BERs by sweeping at least a portion between the initial position and a first sub-sweep end in a first step size; and performing a second sub-sweep process to generate a second portion of the first sequence of sampling positions and a second portion of the first sequence of BERs by sweeping from the first sub-sweep end to the left sweep end in a second step size different from the first step size.

In some embodiments, the performing the first sub-sweep process includes determining the first sub-sweep end in response to a second determination that a difference of last two BERs of the first portion of the first sequence of BERs is less than a second BER difference threshold.

In some embodiments, the performing the left sweep process includes prior to performing the first sub-sweep process, performing a third sub-sweep process to generate a third portion of the first sequence of sampling positions and a third portion of the first sequence of BERs by sweeping from the initial position to a third sub-sweep end located between the initial position and the first sub-sweep end, wherein the third sub-sweep end is determined in response to detecting a first BER in the third portion of the first sequence of BERs that is greater than zero, and wherein the first sub-sweep process sweeps from the third sub-sweep end to the first sub-sweep end.

In some embodiments, the method includes generating, by the eye-scan controller, one or more measurements of the first signal without using an oscilloscope located in a second IC different from the first IC.

In some embodiments, the method includes generating, by a pseudorandom binary sequence (PRBS) generator included in the first IC, a sequence of pseudorandom binary symbols; receiving, by the receiver circuit through an input of the first IC, the sequence of pseudorandom binary symbols; generating, by the receiver circuit, the first signal based on the received sequence of pseudorandom binary symbols; receiving, from a data checker included in the first IC, an error signal generated by comparing the sequence of pseudorandom binary symbols and a sequence of sampled symbols included in the sampled symbol signal; and generating, by the eye-scan controller, the first sequence of BERs and the second sequence of BERs based on the error signal.

In some embodiments, the method includes sweeping, by the eye-scan controller, vertically across an eye diagram associated with the first signal to generate a plurality of sampling amplitudes; and performing, by the eye-scan controller, the left sweep process and the right sweep process for each of the plurality of sampling amplitudes.

Other aspects and features will be evident from reading the following detailed description and accompanying drawings.

BRIEF DESCRIPTION OF THE DRAWINGS

FIG. 7 is a flow diagram of an exemplary process for characterizing a receiver of a communication signal according to some embodiments of the present disclosure.

FIG. 8 is a flow diagram of an exemplary process for interfacing with an eye scan controlling using a register interface unit according to some embodiments of the present disclosure.

FIG. 9 illustrates various sampling positions according to some embodiments of the present disclosure.

DETAILED DESCRIPTION

Figure 1:
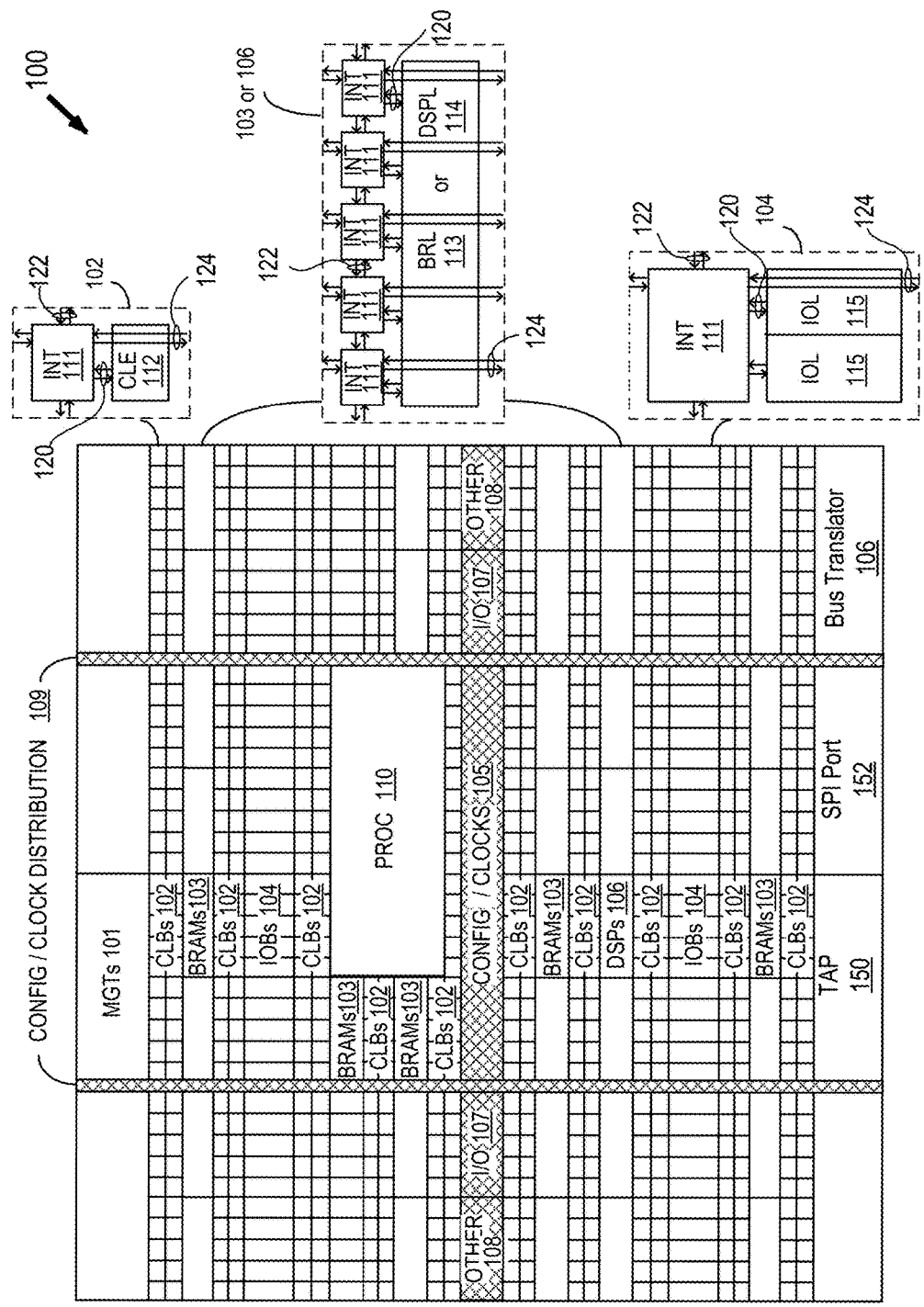
FIG. 1 is a block diagram illustrating an exemplary architecture for an IC according to some embodiments of the present disclosure.

Various embodiments are described hereinafter with reference to the figures, in which exemplary embodiments are shown. The claimed invention may, however, be embodied in different forms and should not be construed as being limited to the embodiments set forth herein. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described. The features, functions, and advantages may be achieved independently in various embodiments or may be combined in yet other embodiments.

Before describing exemplary embodiments illustratively depicted in the several figures, a general introduction is provided to further understanding. When the analog values and transitions of received data symbols are accumulated and displayed over a unit interval (UI), the resulting display is denoted as an "eye diagram," because the rising and falling transitions at the beginning and end of the UI frame the general shape of an open eye. The eye diagram may give the margin of the sampling position, and enables the selection of an operating sampling position with an optimum margin. For integrated circuit (IC) solutions, it has been discovered that by using bit error rates of the received data symbols provided based on a sequence of pseudorandom binary symbols, the eye diagram of the receiver may be measured and calculated within the integrated circuit where the receiver is located. By providing direct measurements at the receiver within the same integrated circuit as the receiver, the test time is reduced, and expensive external test equipment is eliminated.

With the above general understanding borne in mind, various embodiments for characterizing a receiver of a communication signal are described below.

Because one or more of the above-described embodiments are exemplified using a particular type of IC, a detailed description of such an IC is provided below. However, it should be understood that other types of ICs may benefit from one or more of the embodiments described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or complex programmable logic devices (CPLDs). A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

In general, each of these programmable logic devices ("PLDs"), the functionality of the device is controlled by configuration data provided to the device for that purpose. The configuration data can be stored in volatile memory (e.g., static memory cells, as common in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

As noted above, advanced FPGAs can include several different types of programmable logic blocks in the array. For example, FIG. 1 illustrates an exemplary FPGA architecture 100. The FPGA architecture 100 includes a large number of different programmable tiles, including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile can include at least one programmable interconnect element ("INT") 111 having connections to input and output terminals 120 of a programmable logic element within the same tile, as shown by examples included at the top of FIG. 1. Each programmable interconnect element 111 can also include connections to interconnect segments 122 of adjacent programmable interconnect element(s) in the same tile or other tile(s). Each programmable interconnect element 111 can also include connections to interconnect segments 124 of general routing resources between logic blocks (not shown). The general routing resources can include routing channels between logic blocks (not shown) comprising tracks of interconnect segments (e.g., interconnect segments 124) and switch blocks (not shown) for connecting interconnect segments. The interconnect segments of the general routing resources (e.g., interconnect segments 124) can span one or more logic blocks. The programmable interconnect elements 111 taken together with the general routing resources implement a programmable interconnect structure ("programmable interconnect") for the illustrated FPGA.

In an example implementation, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 106 can include a DSP logic element ("DSPL") 114 in addition to an appropriate number of programmable interconnect elements. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the example of FIG. 1, an area (depicted horizontally) near the center of the die (e.g., formed of regions 105, 107, and 108 shown in FIG. 1) can be used for configuration, clock, and other control logic. Column 109 (depicted vertically) extending from this horizontal area or other columns may be used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, PROC 110 spans several columns of CLBs and BRAMs. PROC 110 can include various components ranging from a single microprocessor to a complete programmable processing system of microprocessor(s), memory controllers, peripherals, and the like.

In one aspect, PROC 110 is implemented as a dedicated circuitry, e.g., as a hard-wired processor, that is fabricated as part of the die that implements the programmable circuitry of the IC. PROC 110 can represent any of a variety of different processor types and/or systems ranging in complexity from an individual processor, e.g., a single core capable of executing program code, to an entire processor system having one or more cores, modules, co-processors, interfaces, or the like.

In another aspect, PROC 110 is omitted from architecture 100, and may be replaced with one or more of the other varieties of the programmable blocks described. Further, such blocks can be utilized to form a "soft processor" in that the various blocks of programmable circuitry can be used to form a processor that can execute program code, as is the case with PROC 110.

The phrase "programmable circuitry" can refer to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, portions shown in FIG. 1 that are external to PROC 110 such as CLBs 102 and BRAMs 103 can be considered programmable circuitry of the IC.

In some embodiments, the functionality and connectivity of programmable circuitry are not established until configuration data is loaded into the IC. A set of configuration data can be used to program programmable circuitry of an IC such as an FPGA. The configuration data is, in some cases, referred to as a "configuration bitstream." In general, programmable circuitry is not operational or functional without first loading a configuration bitstream into the IC. The configuration bitstream effectively implements or instantiates a particular circuit design within the programmable circuitry. The circuit design specifies, for example, functional aspects of the programmable circuit blocks and physical connectivity among the various programmable circuit blocks.

In some embodiments, circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 110.

In some instances, hardwired circuitry can have one or more operational modes that can be set or selected according to register settings or values stored in one or more memory elements within the IC. The operational modes can be set, for example, through the loading of a configuration bitstream into the IC. Despite this ability, hardwired circuitry is not considered programmable circuitry as the hardwired circuitry is operable and has a particular function when manufactured as part of the IC.

FIG. 1 is intended to illustrate an exemplary architecture that can be used to implement an IC that includes programmable circuitry, e.g., a programmable fabric. For example, the numbers of logic blocks in a row, the relative width of the rows, the number and order of rows, the types of logic blocks included in the rows, the relative sizes of the logic blocks, and the interconnect/logic implementations included at the top of FIG. 1 are purely exemplary. For example, in an actual IC, more than one adjacent row of CLBs is typically included wherever the CLBs appear, to facilitate the efficient implementation of user logic, but the number of adjacent CLB rows varies with the overall size of the IC. Moreover, the FPGA of FIG. 1 illustrates one example of a programmable IC that can employ examples of the interconnect circuits described herein. The interconnect circuits described herein can be used in other types of programmable ICs, such as CPLDs or any type of programmable IC having a programmable interconnect structure for selectively coupling logic elements.

It is noted that the IC that may implement the receiver and the characterization system for characterizing the receiver is not limited to the exemplary IC depicted in FIG. 1, and that IC having other configurations, or other types of IC, may also implement the receiver and the characterization system for characterizing the receiver.

Figure 2:
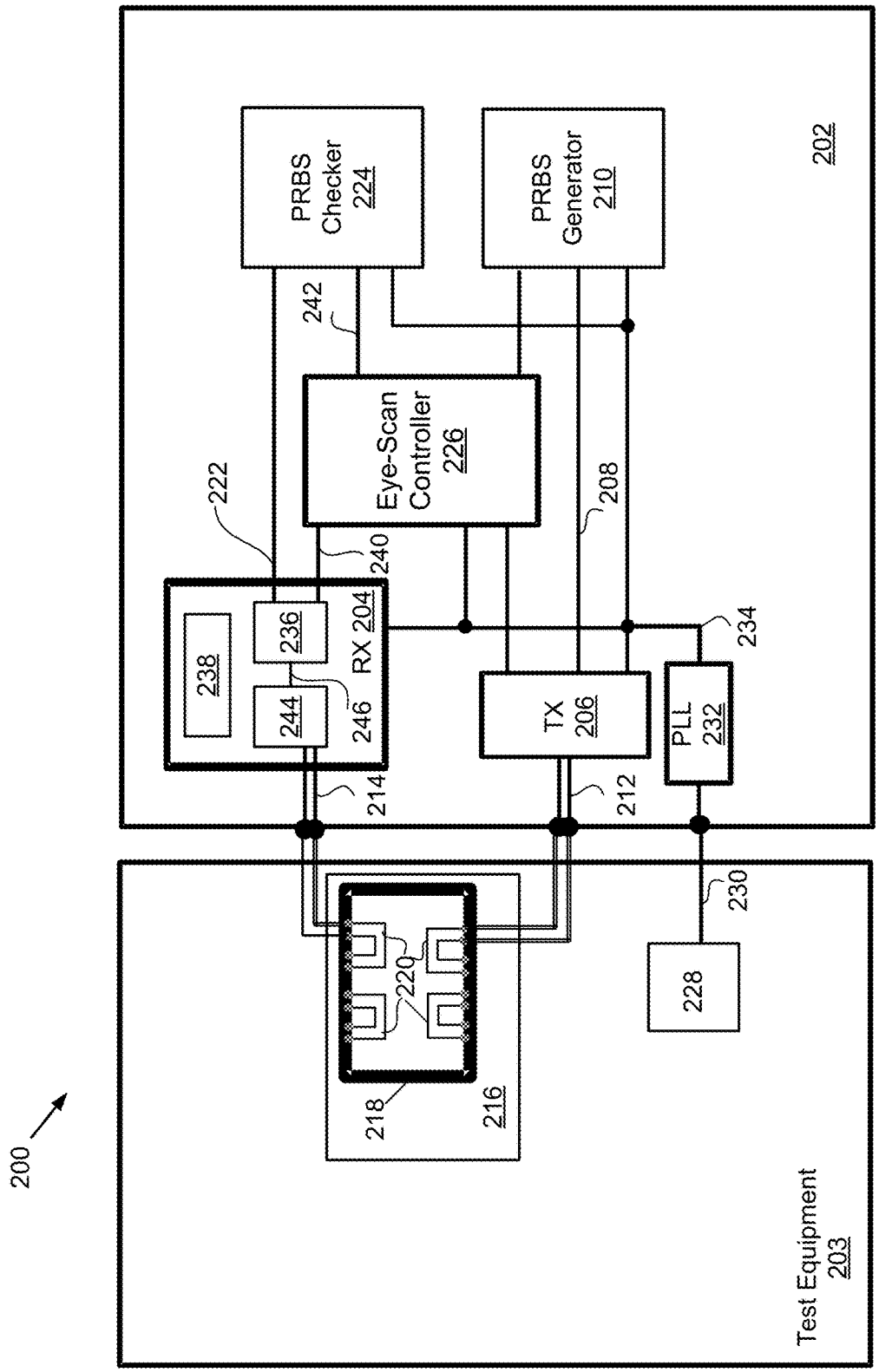
FIG. 2 is a block diagram illustrating an exemplary characterization system according to some embodiments of the present disclosure.

Referring to FIG. 2, illustrated is an exemplary characterization system 200. As discussed in detail below, the characterization system 200 may include a receiver, a PRBS generator, a PRBS checker, and an eye-scan controller on the same chip, which allows the measurement of various eye components of the receiver internally without using an external oscilloscope (scope). Furthermore, in some embodiments, by using such a characterization system 200 including the PRBS generator, a PRBS checker, and an eye-scan controller on the same integrated circuit as the receiver, an input signal of the integrated circuit may be measured by the characterization system 200. Such measurements of the input signal may be hard to be achieved by an external oscilloscope, which may only measure an output signal of the integrated circuit where the receiver is located. While in some embodiments, the characterization system 200 may use external test equipment (e.g., for injecting jitters, generating reference clocks), such external test equipment may include jitter injection devices (e.g., traces) and reference clocks without using an oscilloscope.

In the illustrated example of FIG. 2, the characterization system 200 includes an IC 202 and external test equipment 203. The IC 202 includes a receiver 204, a transmitter 206, a PRBS generator 210, a PRBS checker 224, and an eye-scan controller 226. The test equipment 203 includes a backplane 216 configured to receive a signal 212 from the IC 202. The backplane 216 may include a jitter injection circuit 218 configured to inject various amount and types of jitter to the signal 212, and send the resulting signal 214 to the IC 202. For example, the jitter injection circuit 218 may include traces 220 of various lengths (e.g., 10", 15", 30", 40", or any suitable length) for injecting jitter to the signal 214. Various jitters including, for example, sinusoidal jitter (SJ) and bounded uncorrelated jitter (BUJ) may be injected to the signal 214.

In some embodiments, the test equipment 203 includes a clock source 228 providing a reference clock 230. The reference clock 230 may be sent to the IC 202. The PLL 232 of the IC 202 may receive the reference clock 230, and generates a clock signal 234 based on the reference clock 230. The clock signal 234 may be sent to various components of the IC 202 including, for example, the receiver 204, the transmitter 206, the PRBS generator 210, the PRBS checker 224, and the eye-scan controller 226.

In some embodiments, the IC 202 includes a PRBS generator 210. The PRBS generator 210 may receive the clock signal 234, and generates a PRBS signal 208 including a sequence of pseudorandom symbols. The transitions of the PRBS signal 208 may be synchronous with the clock signal 234. In an example, the PRBS generator 210 is a linear feedback shift register (LFSR). A transmitter 206 receives the PRBS signal 208 from the PRBS generator 210, and outputs a signal 212, which may then sent to the receiver 204 through the test equipment 203.

In the illustrated example of FIG. 2, the backplane 216 is used to so that a receiver 204 receives a signal that is sent by the transmitter 206, where the receiver 204 and the transmitter 206 are located on the same IC 202. Alternatively, in some embodiments, the backplane 216 may be used to allow the receiver 204 to receive a signal from a device (e.g., a memory, a transmitter, etc.) that is not located in the IC 202.

In the illustrated example of FIG. 2, the receiver 204 receives the signal 214 from the test equipment 203, receives the clock signal 234 from the PLL 232, and receives a sampling position signal 240 from an eye-scan controller 226. In some examples, the receiver 204 may also receive a sampling amplitude signal from the eye-scan controller 226, which may change a reference voltage 238 of the receiver 204, which provides the sampling amplitudes of the sampling circuit 236. A sampling circuit 236 of the receiver 204 may sample the signal 214 at a sampling position provided by the sampling position signal 240 and the sampling amplitude provided by the sampling amplitude signal, and generate a sampled symbol signal 222 including a sequence of sampled symbols.

In some embodiments, the sampled symbol signal 222 including the sequence of sampled symbols is sent to a PRBS checker 224 of the IC 202. The PRBS checker 224 may generate a check sequence of pseudo-random binary symbols that match the sequence of the pseudo-random binary symbols that is generated by the PRBS generator 210 and transmitted by the transmitter 206 on the signal 208. In some embodiments, the PRBS generator 210 and the PRBS checker 224 implement the same linear feedback shift register (LFSR) with feedback taps based on a particular primitive polynomial.

In some embodiments, the PRBS checker may determine that the sampled symbols have bit errors by detecting that the check sequence of pseudo-random binary symbols does not match the sequence of sampled symbols in the sampled symbol signal 222 provided by the receiver 204. The PRBS checker 224 may generate an error signal 242 including error information (e.g., a total error bit count) of such bit errors, and send the error signal 242 to an eye-scan controller 226.

In various embodiments, an eye-scan controller 226 may communicate with and control various components in the IC 202 including, for example, the receiver 204, the PRBS checker 224, the PRBS generator 210, and the transmitter 206. For example, the eye-scan controller 226 may control the sampling position and sampling amplitude used by the sampling circuit 236 using a sampling position signal 240 and a sampling amplitude signal. The eye-scan controller 226 may receive from the PRBS checker 224 the error signal 242, and calculate bit error rates with respect to the corresponding sampling positions based on the error information.

Figure 3:
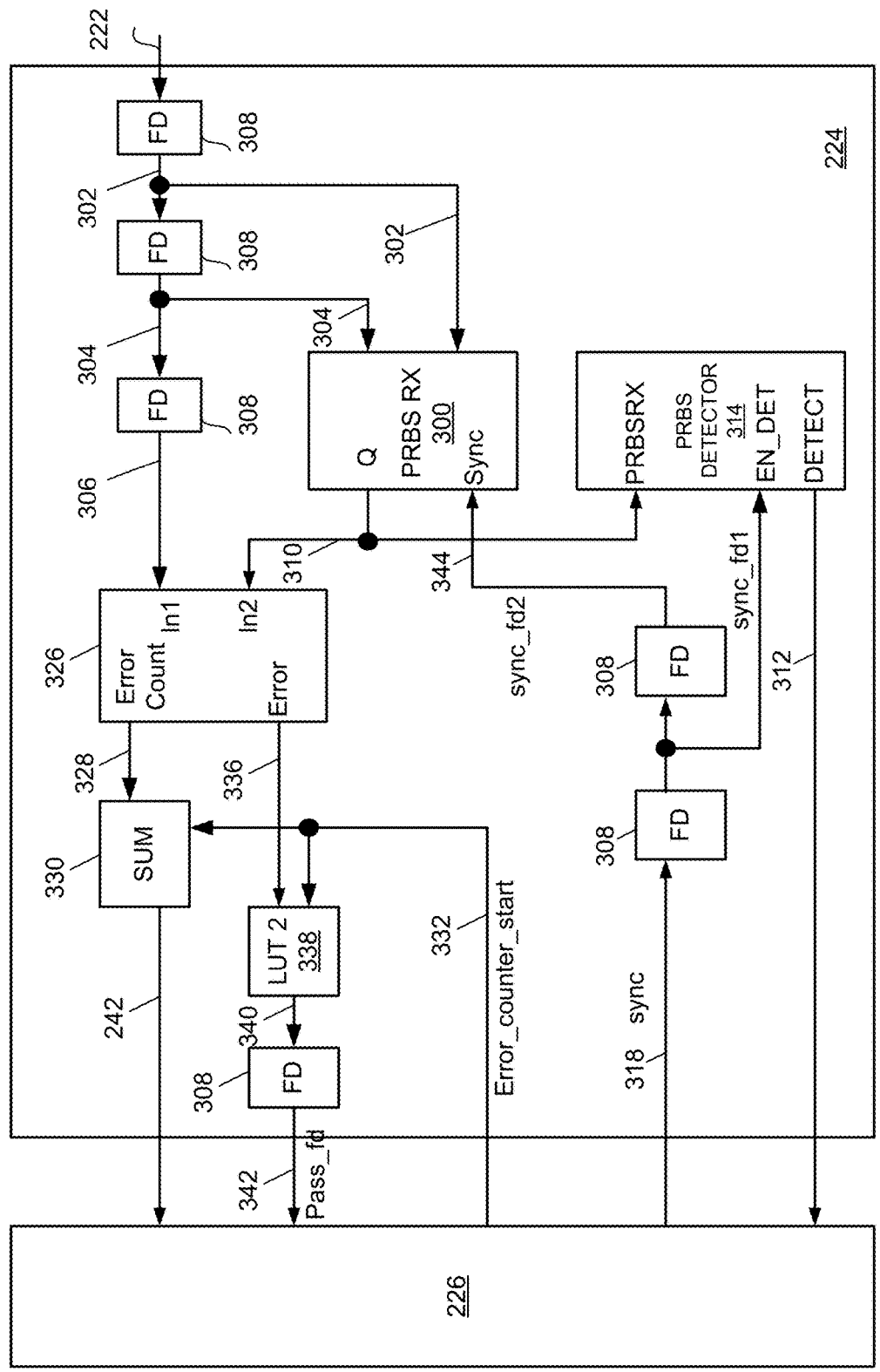
FIG. 3 is a block diagram illustrating an exemplary pseudorandom binary sequence (PRBS) checker according to some embodiments of the present disclosure.

Referring to FIG. 3, illustrated is an exemplary PRBS checker 224 connected to the eye-scan controller 226 and the receiver 204. As discussed in detail below, in some embodiments, the PRBS checker may generate bit error counts for corresponding sampling positions, and BERs may be generated by the eye-scan controller 226 based on those bit error counts. By using BERs generated by the PRBS checker 224 and eye-scan controller 226 located on the same integrated circuit as the receiver 204, various eye components of an input signal of the integrated circuit provided by the receiver may be measured. Furthermore, in some embodiments, such measurement may be achieved without using any external oscilloscope, which may reduce the test time and the test cost by eliminating expensive external test equipment (e.g., an external oscilloscope).

In some embodiments, the eye-scan controller 226 may provide a synchronization signal 318 to the PRBS checker 224, which may be used to align the PRBS check sequence and the sequence of sampled symbols for comparison. The PRBS checker 224 may include a PRBS receiver 300, a PRBS detector 314, and a PRBS error count generator 326.

In some embodiments, the PRBS checker 224 may receive a sampled symbol signal 222 including a sequence of sampled symbols from the receiver 204. The sampled symbol signal 222 is sent to cascaded shift registers 308 for generating signals 302, 304, and 306. Each of the shift registers 308 may be a D-type flip-flop (DFF). The signals 302, 304, and 306 are delayed versions of the sampled symbol signal 222 having delays D1, D2, and D3 relative to the sampled symbol signal 222.

The PRBS receiver 300 may receive the signals 302 and 304 with delays D1 and D2 respectively, and provide a signal 310 to the PRBS error count generator 326. The signal 310 may be a delayed version of the sampled symbol signal 222 synchronized with a synchronization signal 344, which is generated based on a synchronization signal 318 provided by the eye-scan controller 226.

In some embodiments, the PRBS error count generator 326 receives the signals 306 and 310 including a sequence of sampled symbols provided by the sampled symbol signal 222, and performs a comparison of the sequence of sampled symbols and a check sequence of pseudorandom binary symbols. Upon detecting one or more bit errors in the sequence of sampled symbols, the PRBS error count generator 326 generates an error count signal 328 indicating the detected bit errors is sent to a summer 330, which may generate a total bit error count for a particular period. The eye-scan controller 226 may control such a particular period using an error count start indication signal 332. For example, after receiving an error count start indication signal 332 from the eye-scan controller 226, the summer 330 may reset a counter to zero, and begin to count the bit errors received from the PRBS error count generator 326. A total error count signal 334 indicating a total error count during that particular period may be sent to the eye-scan controller 226.

In some embodiments, the PRBS error count generator 326 provides an error signal 336 to a look-up table 338 for generating a pass signal 340. A pass signal 342 may be generated using a shift register 308. In an example, the look-up table 338 functions as an AND gate to ensure that the error signal 336 is passed only when the error count start indication signal 332 is high. The output pass signal 340 of the look-up table 338 is synchronized with the shift register 308 to generate a synchronized pass signal 342. The synchronized pass signal 342 may be used by the eye-scan controller 226 to determine whether the PRBS symbols received by the PRBS detector 314 are correct.

In some embodiments, the PRBS detector 314 may receive the signal 310 from the PRBS receiver 300, and perform a PRBS detection process by comparing the sequence of sampled symbols in the signal 310 and the check sequence of pseudo-random binary symbols, and determine whether a valid sequence of sampled symbols is found. The PRBS detector 314 may then generate a valid sequence indication signal 312 including an indication that a valid sequence of sampled symbols is found, and send the valid sequence indication signal 312 to the eye-scan controller 226. The eye-scan controller 226 may determine whether a valid sequence is received based on the synchronized pass signal 342 and the valid sequence indication signal 312. In other words, the valid sequence indication signal 312 is a safeguard signal against false passes.

Figure 4:
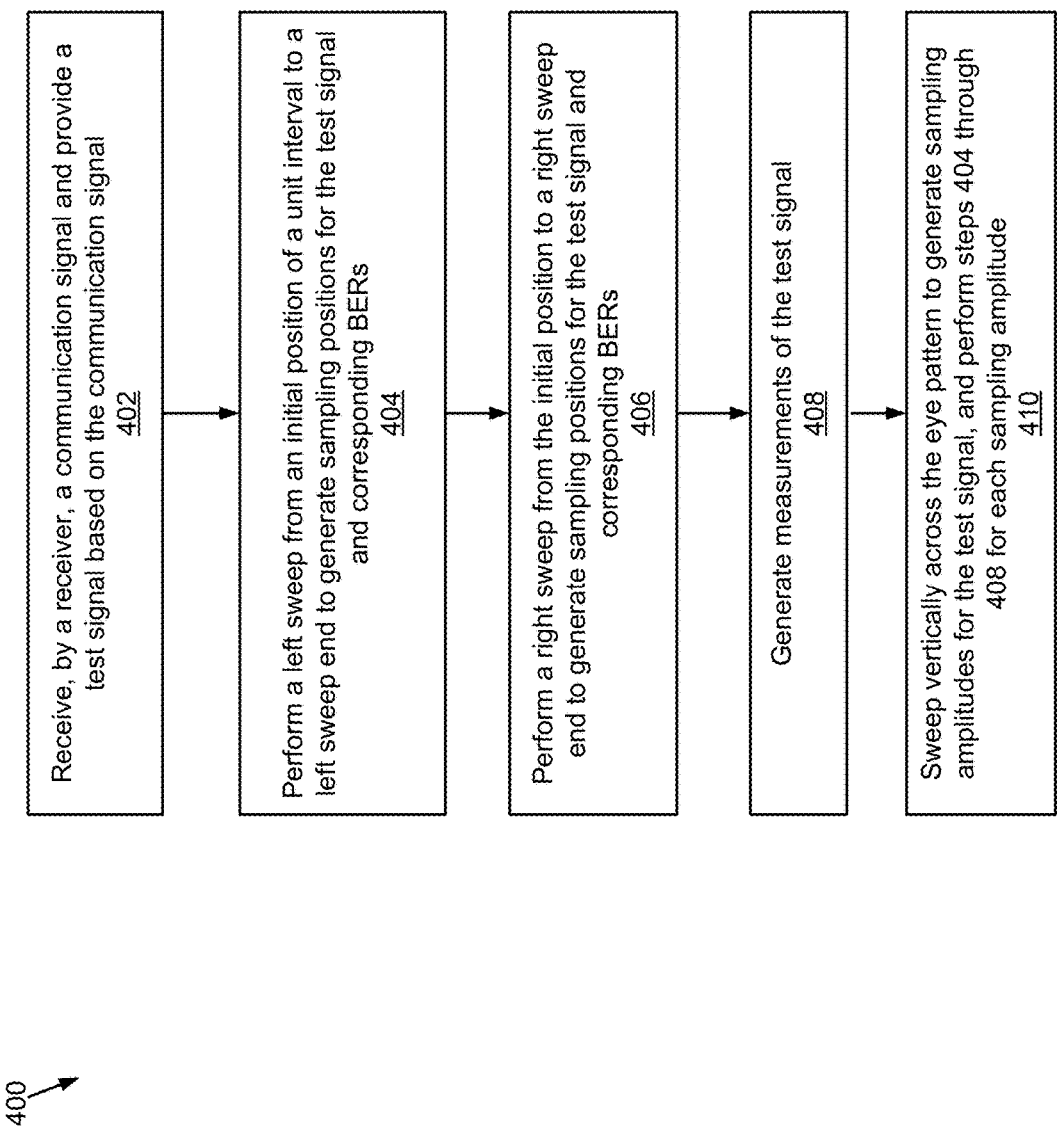
FIG. 4 is a flow diagram of an exemplary process for characterizing a receiver of a communication signal according to some embodiments of the present disclosure.

Referring to FIG. 4, illustrated is a method 400 for characterizing a receiver. As described in detail below, in some embodiments, the method 400 may be performed by various components (e.g., a receiver, a PRBS generator, a PRBS checker, an eye-scan controller) located on the same integrated circuit as a receiver. As such, an input signal to that integrated circuit (e.g., received by the receiver) may be measured. Furthermore, in some embodiments, by performing the steps of the method 400 using components located on the same integrated circuit, expensive external test equipment (e.g., an external oscilloscope) is eliminated.

The method 400 begins at block 402, where a receiver receives a communication signal, and provides a test signal based on the communication signal. Referring to FIG. 2, at block 402, a receiver 204 receives a communication signal 214, and outputs a test signal 246 at an input buffer 244 of the receiver 204. In an example, the test signal 246 includes a sequence of pseudorandom binary symbols.

Figure 5:
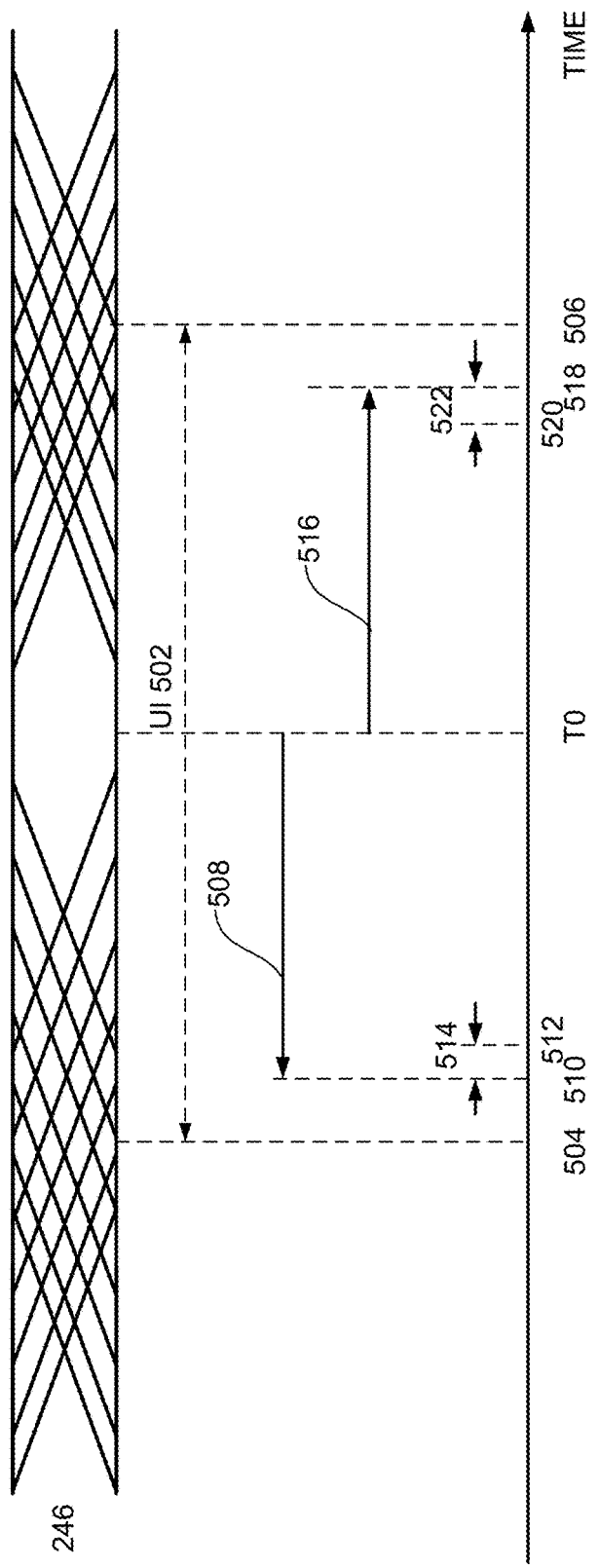
FIG. 5 illustrates various sampling positions according to some embodiments of the present disclosure.

The method 400 may then proceed to block 404, where an eye-scan controller performs a left sweep process from an initial position at a unit interval to a left sweep end to generate sampling positions for the test signal. Referring to FIG. 5, illustrated therein is a unit interval 502 corresponding to the test signal 246. The unit interval 502 is an interval taken by each symbol of the test signal 246, and may also be referred to as a symbol duration time 502. The unit interval 502 extends from a left end 504 to a right end 506 along a time axis. At block 404, the eye-scan controller 226 may first determine an initial position T0. In an example, the initial position T0 is at the center of the unit interval 502. In another example, the initial position T0 may be a distance away from the center of the unit interval 502. In such an example, that distance may be determined based characteristics of other circuits (e.g., a delay of a decision feedback equalizer (DFE) circuit) of the receiver 204. In yet another example, the initial position T0 may be any position in the unit interval 502 where a bit error rate for sampling the test signal 246 at the initial position T0 is lower than a predetermined BER threshold (e.g., $10^{-12}$).

At block 404, the eye-scan controller 226 may perform a left sweep process 508 from the initial position T0 toward the left end 504 of the UI 502. The left sweep process 508 may include a plurality of steps, and generate a sampling position for each step. For each step, the eye-scan controller 226 may shift the sampling position toward the left end 504 by a step size, and provide the sampling position in a sampling position signal 240 to the sampling circuit 236 of the receiver 204. At each step, the eye-scan controller 226 may also provide a predetermined number (e.g., one million) of clock cycles, and the test signal 246 is to be sampled at the corresponding sampling position for the predetermined number of clock cycles.

At block 404, for each step of the left sweep process 508, the sampling circuit 236 of the receiver 204 may generate a sampled symbol signal 222 including a sequence of sampled symbols by sampling the test signal 246 at a particular sampling position provided by the sampling position signal 240. The PRBS checker 224 may receive the sampled symbol signal 222, compare the sequence of sampled symbols and a check sequence of pseudo-random binary symbols, and send an error signal 242 to the eye-scan controller 226. The error signal 242 may include a total error bit count of all the detected error bits during the step. The eye-scan controller 226 may then compute a BER corresponding to the particular sampling position, for example, by dividing the total error bit count by the predetermined number of clock cycles for that particular sampling position.

While sweeping toward the left end 504 of the UI 502, the eye-scan controller 226 may determine a left sweep end based on a termination criterion, and terminate the left sweep process 508 at the left sweep end. In some embodiments, the termination criterion is associated with the BERs generated during the left sweep process. As shown in FIG. 5, the left sweep process 508 proceeds to a sampling position 510. The eye-scan controller 226 determines the termination criterion is satisfied, and in response to that determination, the eye-scan controller 226 determines that the sampling position 510 is the left sweep end, and terminates the left sweep process 508.

In some embodiments, the termination criterion is that a difference between BERs of the last two or more steps of the left sweep process 508 is less than a predetermined BER difference threshold. As shown in FIG. 5, the left sweep process 508 first proceeds to a sampling position 512 and generates a corresponding BER. Then the left sweep process 508 shifts the sampling position 512 by a step size 514 to arrive at the sampling position 510 and generates a corresponding BER. The eye-scan controller 226 determines that a difference between the last two BERs corresponding to the sampling positions 512 and 510 is less than a predetermined BER difference threshold (e.g., a BER difference threshold equal to or greater than $10^{-5}$). In response to that determination, the eye-scan controller 226 determines that the sampling position 510 is the left sweep end, and terminates the left sweep process 508. In one particular example where the left sweep process 508 ends at the sampling position 510, the difference between the total error counts of the last two steps at the sampling positions 512 and 510 is less than about 50, the step size is 1 picosecond, the number of total clock cycles for each step is one million, and the predetermined BER difference threshold is $5*10^{-5}$.

Various types of termination criteria may be used for the left sweep process 508. For example, a termination criterion may provide that a BER of a last step of the left sweep process 508 is greater than a predetermined BER threshold (e.g., a BER threshold greater than 0.45). In another example, a termination criterion may provide that a ratio between the difference between the last two BERs and the last step size 514 is less than a predetermined BER difference ratio threshold (e.g., a BER difference ratio threshold at least equal to $10^{-17}$). In yet another example, a termination criterion may provide that a slope of a BER to time plot at the sampling position 510 is less than a predetermined BER slope threshold (e.g., a BER slope threshold less than 5%). Such BER slope thresholds may be determined based on jitter measurement requirements (e.g., deterministic jitter and random jitter measurement requirements).

The method 400 may then proceed to block 406, where an eye-scan controller 226 performs a right sweep process from the initial position T0 to a right sweep end to generate sampling positions for the sampling circuit 236. The right sweep process may be substantially similar to the left sweep process 508 except the differences described below. Referring to FIG. 5, at block 406, the eye-scan controller 226 may perform a right sweep process 516 from the initial position T0 toward the right end 506 of the UI 502. The right sweep process 516 may include a plurality of steps, and generate a sampling position for each step. For each step, the eye-scan controller 226 may shift the sampling position toward the right end 506 by a step size, and provide the sampling position in the sampling position signal 240 to the sampling circuit 236 of the receiver 204. At each step, the eye-scan controller 226 may also provide a predetermined number (e.g., one million) of clock cycles, and the sampling circuit 236 samples the test signal 246 at the corresponding sampling position for the predetermined number of clock cycles.

In various embodiments, the eye-scan controller 226 may determine a right sweep end based on a termination criterion, and terminate the right sweep process 516 at the right sweep end. In an example, the termination criterion provides that a difference between the last two BERs in the right sweep process 516 is less than a predetermined BER difference threshold. In the example of FIG. 5, the right sweep process 516 first proceeds to a sampling position 520 and generate a corresponding BER. Then the right sweep process 516 shifts the sampling position 520 by a step size 522 to arrive at the sampling position 518 and generates a corresponding BER. In an example, the eye-scan controller 226 determines that a difference between the last two BERs corresponding to the sampling positions 520 and 518 is less than a predetermined BER difference threshold (e.g., a BER difference threshold equal to or greater than $10^{-5}$). In response to that determination, the eye-scan controller 226 determines that the sampling position 518 is the right sweep end, and terminates the right sweep process 516.

In some embodiments, the termination criteria for the left sweep process 508 and the right sweep process 516 are the same. Alternatively, in some embodiments, the termination criteria for the left sweep process 508 and the right sweep process 516 are different. In one example, the termination criteria for the left sweep process 508 and the right sweep process 516 have different types (e.g., based on the last BER, a difference of last two BERs, a slope of the BER versus time plot at the last step). In another example, the termination criteria for the left sweep process 508 and the right sweep process 516 have the same type but different threshold values.

Figure 6:
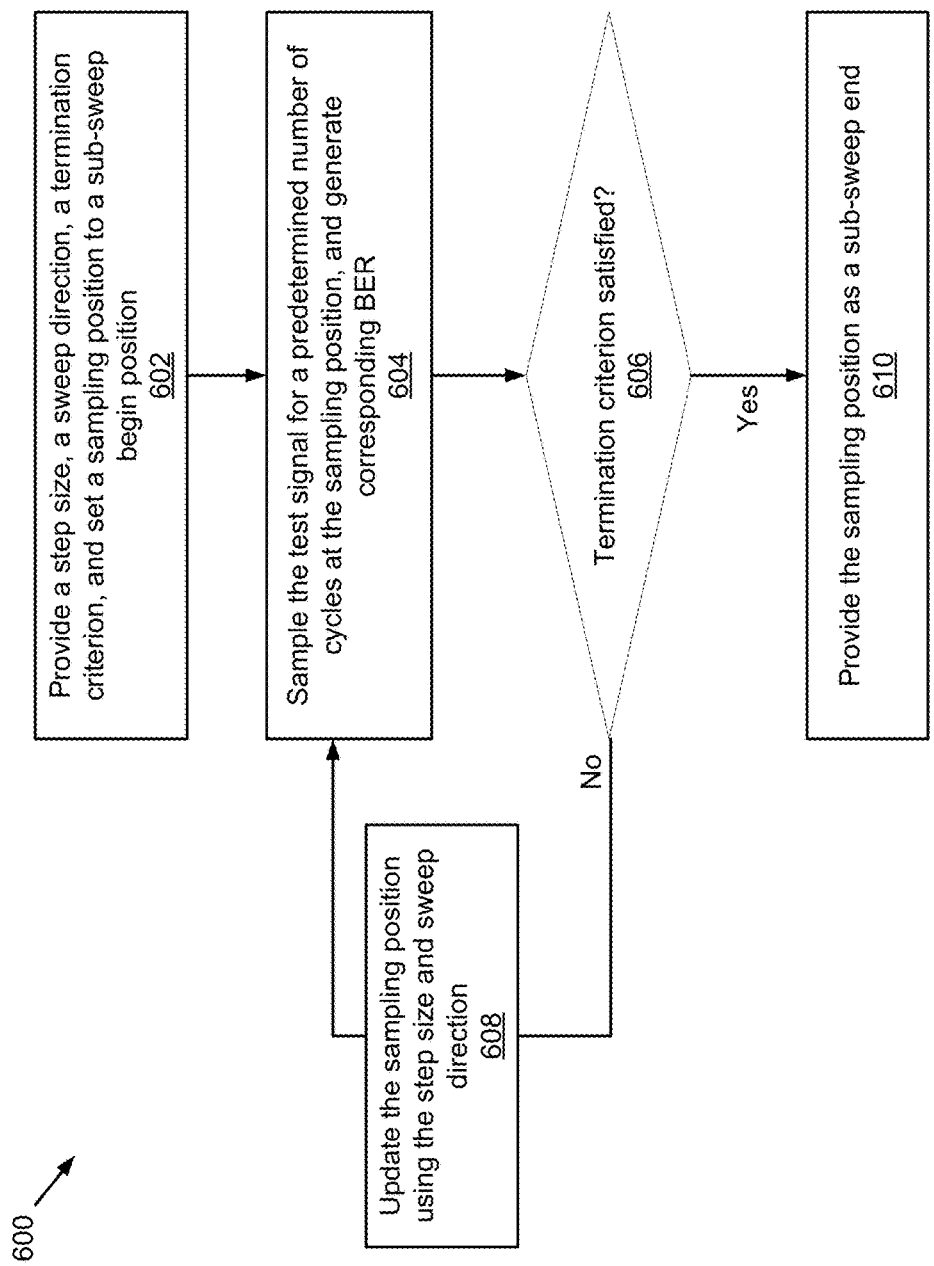
FIG. 6 is a flow diagram of an exemplary process for characterizing a receiver of a communication signal according to some embodiments of the present disclosure.

Referring to FIGS. 6, 7, 8, and 9, in various embodiments, each of the left sweep process 508 and the right sweep process 516 may include one or more sub-sweep processes, each sub-sweep process having a fixed step size and a fixed sweep direction. FIG. 6 illustrates a sub-sweep process 600 having a fixed step size and a fixed sweep direction. FIG. 7 illustrates an exemplary left sweep process 508 including a plurality of sub-sweep processes. FIG. 8 illustrates an exemplary right sweep process 516 including a plurality of sub-sweep processes. FIG. 9 illustrates the left sweep process 508 and the right sweep process 516 each including a plurality of sub-sweep processes.

Referring to FIG. 6, the sub-sweep process 600 begins at block 602, where various sub-sweep parameters for the sub-sweep process 600 is provided. The sub-sweep parameters may include a step size (e.g., between 1% and 20% of the UI 502), a sweep direction (e.g., toward a left end 504 of the UI 502, toward a right end 506 of the UI 502), a termination criterion, and any other suitable sub-sweep parameters. In an example, the sub-sweep parameters remain the same through a particular sub-sweep process. At block 602, the eye-scan controller 226 may provide a sub-sweep begin position to the sampling position signal 240.

The sub-sweep process 600 may proceed to block 604, where the sampling circuit 236 samples a test signal 246 at a particular sampling position provided by the sampling position signal 240 for a predetermined number of clock cycles. The resulting sampled symbol signal 222 is provided to the PRBS checker 224, which performs an error check and sends an error signal 242 to the eye-scan controller 226. The eye-scan controller 226 may then generate a BER corresponding to that particular sampling position based on the error signal 242.

The sub-sweep process 600 may then proceed to block 606, where the eye-scan controller 226 determines whether the termination criterion is satisfied. In some embodiments, the termination criterion is associated with the BER of the current step. For example, the termination criterion is satisfied where the BER of the current step is greater than a BER threshold. In some embodiments, the termination criterion is associated with the difference between the BERs of the current step and the preceding step. In an example, the termination criterion is satisfied where the difference between the BERs of the current step and the preceding step is less than a BER difference threshold. In another example, the termination criterion is satisfied where a ratio between a difference between the BERs of the current step and the preceding step and the step size is less than a BER difference ratio threshold. In yet another example, the termination criterion is satisfied where a slope of a BER to time plot at the current step less than a BER slope threshold.

The sub-sweep process 600 may proceed to block 608 after the eye-scan controller 226 determines that the termination criterion is not satisfied. At block 608, the eye-scan controller 226 may shift the sampling position by the step size in the sweep direction, update the sampling position, and loop back to block 604 to perform the next step with the updated sampling position.

The sub-sweep process 600 may proceed to block 610 after the eye-scan controller 226 determines that the termination criterion is satisfied. At block 610, the current sampling position is provided as a sub-sweep end position, and the sub-sweep process is terminated.

In various embodiments, each of the left sweep process 508 and the right sweep process 516 may include one or more sub-sweep processes 600. In an example, the sub-sweep numbers in the left sweep process 508 and the right sweep process 516 may be the same. In another example, the sub-sweep numbers in the left sweep process 508 and the right sweep process 516 may be different. In yet another example, each of the left sweep process 508 and the right sweep process 516 may include a single sub-sweep process 600. In that example, each of the left sweep process 508 and the right sweep process 516 use a single step size. Alternatively, as shown in FIGS. 7, 8, and 9, each of the left sweep process 508 and the right sweep process 516 include multiple sub-sweep processes 600.

Referring to FIGS. 7 and 9, the left sweep process 508 includes sub-sweep processes 902, 906, and 910, where each sub-sweep process has a sweep direction toward the left end 504 of the UI 502. The left sweep process 508 begins at block 702 to perform a sub-sweep process 902 from the initial position T0 toward the left end 504 of the UI 502 in a step size (e.g., equal to or greater than 20% of the UI 502). The sub-sweep process 902 may have a termination criterion providing that the last BER of the sub-sweep process 902 is greater than zero, and find a first sub-sweep end 904 after determining that the termination criterion is satisfied. In other words, the sub-sweep process 902 terminates after detecting the first error in the sampled symbol signal 222 in the left sweep process 508. As such, the sub-sweep process 902 may be referred to as a left first error sub-sweep process 902, and the first sub-sweep end 904 may be referred to as a left first error sub-sweep end 904.

The left sweep process 508 may proceed to block 704 to perform a sub-sweep process from the first sub-sweep end 904 toward the left end 504 of the UI 502 in a step size (e.g., equal to or greater than 16% of the UI 502). In an example, the step sizes of sub-sweep processes 902 and 906 are the same. In another example, the step sizes of sub-sweep processes 902 and 906 are different (e.g., the step size of the sub-sweep process 902 is greater than that of the sub-sweep process 906). The sub-sweep process 906 may have a termination criterion where a difference between last two BERs of the sub-sweep process 906 is less than a BER difference threshold, determines a sub-sweep end 908 based on the termination criterion.

The left sweep process 508 may then proceed to block 706 to perform a sub-sweep process 910 from the sub-sweep end 908 toward the left end 504 of the UI 502 in a step size (e.g., equal to or greater than 2% of the UI 502) to find the left sweep end 510 of the left sweep process 508. The sub-sweep process 910 may have a termination criterion where a difference between last two BERs (e.g., BERs corresponding to sampling positions 512 and 510) of the sub-sweep process 910 is less than a BER difference threshold, and determines a sub-sweep end 510 based on that termination criterion. In the example of FIG. 9, the sub-sweep process 910 is the last sub-sweep process of the left sweep process 508. As such, the sub-sweep end 510 of the sub-sweep process 910 is the same as the left sweep end 510 of the left sweep process 508.

In some embodiments, the step sizes of the sub-sweep processes 906 and 910 are different. For example, the step size of the sub-sweep processes 910 may be less than that of the sub-sweep process 906. In a particular example, the step sizes of the sub-sweep processes 906 and 910 are 16% and 2% of the UI 502 respectively. In such examples where the step size of the sub-sweep processes 910 is less than that of the sub-sweep process 906, the sub-sweep process 906 may be referred to as a left coarse sub-sweep process 906, and the sub-sweep process 910 may be referred to as a left fine sub-sweep process 910.

Referring to FIGS. 8 and 9, the right sweep process 516 may include sub-sweep processes 912, 916, and 920, where each sub-sweep process has a sweep direction toward the right end 506 of the UI 502. The right sweep process 516 begins at block 802 to perform a sub-sweep process 912 from the initial position T0 toward the right end 506 of the UI 502 in a step size (e.g., at 20% of the UI 502). The sub-sweep process 912 may have a termination criterion providing that the last BER of the sub-sweep process 912 is greater than zero, and find a sub-sweep end 914 after determining that the termination criterion is satisfied. In other words, the sub-sweep process 912 terminates at the sub-sweep end 914 after detecting the first error in the sampled symbol signal 222 in the right sweep process 516. As such, the sub-sweep process 912 may be referred to as a right first error sub-sweep process, and the sub-sweep end 914 may be referred to as a right first error sub-sweep end 914.

The right sweep process 516 may proceed to block 804 to perform a sub-sweep process 916 from the right first error sub-sweep end 914 toward the right end 506 of the UI 502 in a step size (e.g., a step size equal to or greater than 16% of the UI 502). The sub-sweep process 916 may have a termination criterion where a difference between last two BERs of the sub-sweep process 916 is less than a BER difference threshold, and determine the sub-sweep end 918 based on the termination criterion.

The right sweep process 516 may then proceed to block 806 to perform a sub-sweep process 920 from the sub-sweep end 918 toward the right end 506 of the UI 502 in a step size (e.g., a step size equal to or greater than 2% of the UI 502). The sub-sweep process 920 may have a termination criterion providing a difference between last two BERs (e.g., BERs corresponding to sampling positions 520 and 518) of the sub-sweep process 920 is less than a BER difference threshold. A sub-sweep end 518 may be determined based on that termination criterion. In the example of FIG. 9, the sub-sweep process 920 is the last sub-sweep process of the right sweep process 516. As such, the sub-sweep end 518 is the same as the right sweep end 518 of the right sweep process 516.

In some embodiments, the step sizes of the sub-sweep processes 916 and 920 are different. For example, the step size of the sub-sweep processes 920 may be less than that of the sub-sweep process 916. In a particular example, the step sizes of the sub-sweep processes 916 and 920 are 16% and 2% of the UI 502 respectively. In such examples where the step size of the sub-sweep processes 920 is less than that of the sub-sweep process 916, the sub-sweep process 916 may be referred to as a right coarse sub-sweep process 916, and the sub-sweep process 920 may be referred to as a right fine sub-sweep process 920.

In some embodiments, the step sizes of a pair of corresponding sub-sweep processes in the left sweep process 508 and right sweep process 516 (e.g., a pair of sub-sweep processes 902 and 912, a pair of sub-sweep processes 906 and 916, a pair of sub-sweep processes 910 and 920) are the same. In some alternative embodiments, the step sizes of the pair of corresponding sub-sweep processes in the left sweep process 508 and right sweep process 516 are different.

Figure 10:
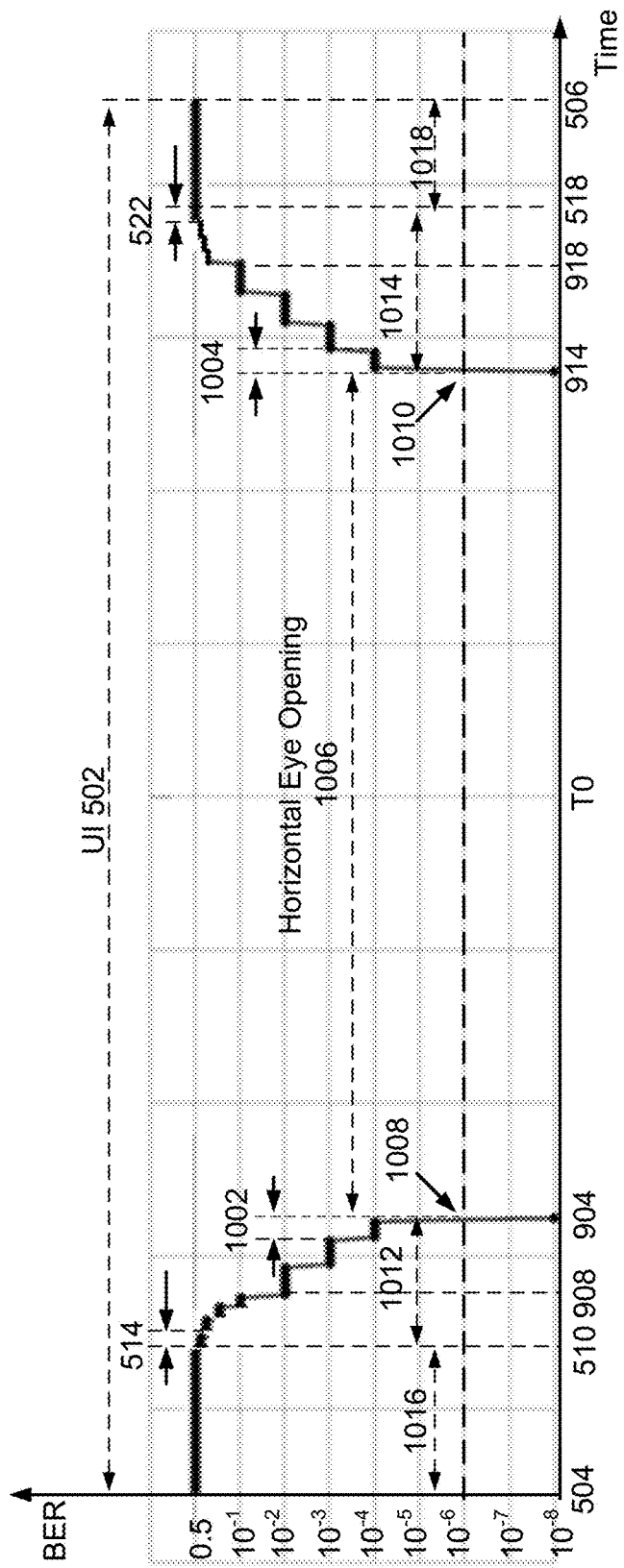
FIG. 10 illustrates a bit error rate versus time plot according to some embodiments of the present disclosure.

The method 400 may then proceed to block 408, where the eye-scan controller 226 may generate various eye measurements for the eye diagram associated with the test signal 246. Referring to FIG. 10, illustrated is a BER versus time plot generated based on the BERs from the left sweep process 508 and right sweep process 516. The left sweep process 508 includes a sub-sweep process sweeping from T0 to the sub-sweep end 904, a sub-sweep process sweeping from the sub-sweep end 904 to a sub-sweep end 908 in a step size 1002, and a sub-sweep process sweeping from the sub-sweep end 908 to the left sweep end 510 in a step size 514. The right sweep process 516 includes a sub-sweep process sweeping from T0 to the sub-sweep end 914, a sub-sweep process sweeping from the sub-sweep end 914 to a sub-sweep end 918 in a step size 1004, and a sub-sweep process sweeping from the sub-sweep end 918 to the right sweep end 518 in a step size 522. Various eye measurements for the eye diagram may be provided based on the BER versus time plot, including for example distances 1006, 1012, 1014, 1016, and 1018. For example, a horizontal eye opening of eye diagram of the test signal 246 at a BER of $10^{-6}$ may be provided based on a distance 1006 between points 1008 and 1010. In another example, total jitter may be provided based on a difference between the UI 502 and the distance 1006. In yet another example, random jitter forms the slope portion of the BER plot, and may be provided by combining left random jitter 1012 (e.g., determined based on a distance extending between the point 1008 and the left sweep end 510) and right random jitter 1014 (e.g., determined based on a distance extending between the point 1010 and the right sweep end 518).

Figure 11:
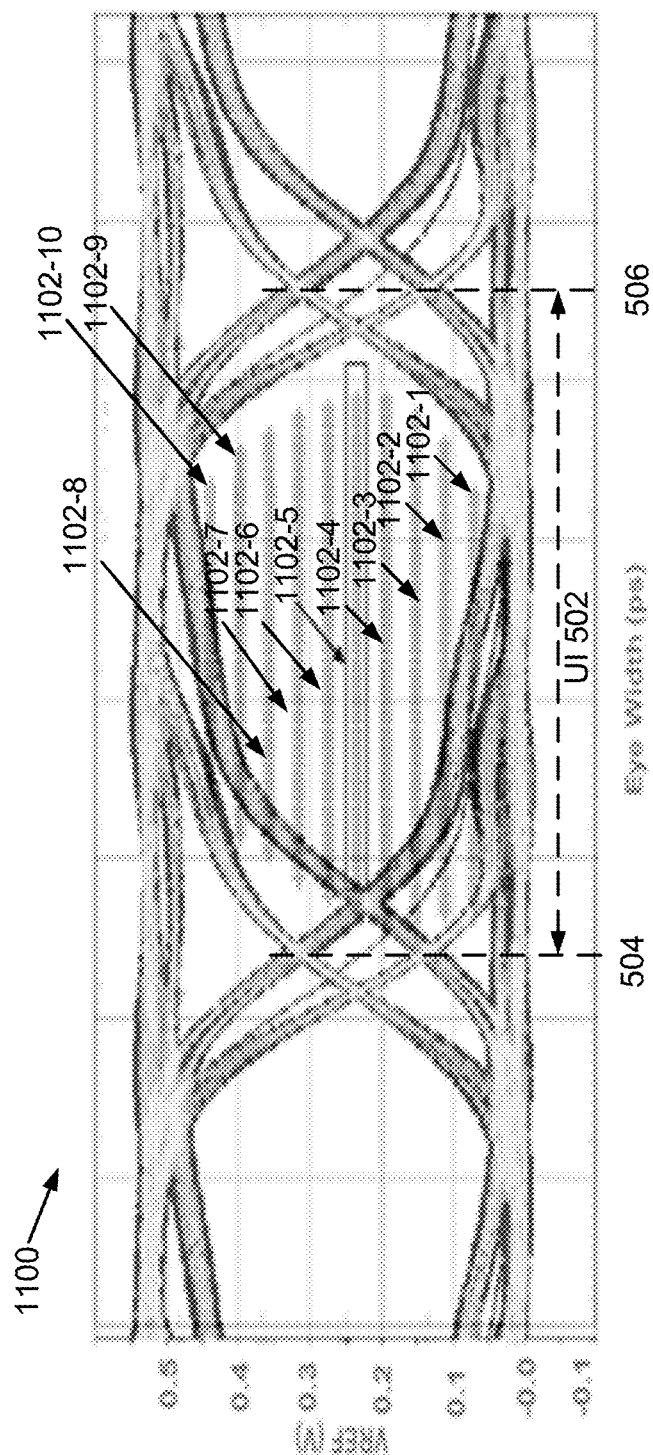
FIG. 11 illustrates an eye diagram according to some embodiments of the present disclosure.

The method 400 may then proceed to block 410, where the eye-scan controller 226 sweeps vertically across the eye diagram associated with the test signal 246 to generate sampling amplitudes and send those sampling amplitudes to the receiver 204. In an example, the reference voltage 238 of the receiver 204 is adjusted based on the received sampling amplitude information, and provides the sampling amplitude to the sampling circuit 236. For each sampling amplitude value, blocks 404 through 408 may be performed to provide a BER versus time plot, which may be referred to as a two-dimensional eye-scan result. Referring to FIG. 11, illustrated is an eye diagram 1100 including a plurality of 2D eye-scan results 1102-1 through 1102-10, each 2D eye-scan result may be achieved by performing blocks 404 through 408 for a corresponding reference voltage 238. By sweeping vertically across the eye diagram, three-dimensional (3D) eye-scan results (e.g., a BER versus time versus voltage plot) may be achieved using the 2D eye-scan results 1102-1 through 1102-10. Such 3D eye-scan results may be used to determine the vertical components (e.g., vertical eye opening) of the eye diagram for the test signal 246. In some embodiments, the vertical sweep may use a fixed step size to generate the sampling amplitudes. Alternatively, in some embodiments, the vertical sweep may include sub-sweeps having different step sizes substantially similar to the left sweep 508 and right sweep 516 as discussed above. In an example, a sub-sweep of the vertical sweep further away from a center of the eye diagram may use a step size that is less than that of a sub-sweep closer to the center of the eye diagram.

It is noted that various configurations (e.g., the number of sub-sweeps in the left sweep 508 and right sweep 516, step sizes and termination criteria of the sub-sweeps) illustrated in FIGS. 2-11 are exemplary only and not intended to be limiting beyond what is specifically recited in the claims that follow. It will be understood by those skilled in that art that other configurations may be used. In some embodiments, the test signal 246 includes differential signals PDQS and NDQS, and the eye-scan process may perform the sweeping to the PDQS and NDQS at the same time. In some embodiments, the characterization system 200 may be implemented using one or more processors configured to execute software, an application specific integrated circuit (ASIC), a logic on a programmable logic IC (e.g., FPGA), and any other suitable implementations.

Various advantages may be present in various applications of the present disclosure. No particular advantage is required for all embodiments, and different embodiments may offer different advantages. One of the advantages in some embodiments is that by using a characterization system located on the same integrated circuit as a receiver, an input buffer of the receiver may be measured. For example, the characterization system may include PRBS generator and checker for generating bit error counts for corresponding sampling positions, and BERs may be generated based on those bit error counts. By using BERs generated by an on-chip characterization system which may then be used to measure various eye components of the receiver. By providing direct measurements at the receiver within the same integrated circuit as the receiver, the test time is reduced, and expensive external test equipment is eliminated. Another advantage in some embodiments is that various step sizes may be used in sweeping across the eye diagram horizontally and vertically for generating the horizontal and vertical values of the sampling positions. By using varying step sizes, the test time may be reduced.

Although particular embodiments have been shown and described, it will be understood that it is not intended to limit the claimed inventions to the preferred embodiments, and it will be obvious to those skilled in the art that various changes and modifications may be made without department from the spirit and scope of the claimed inventions. The specification and drawings are, accordingly, to be regarded in an illustrative rather than restrictive sense. The claimed inventions are intended to cover alternatives, modifications, and equivalents.

What is claimed is:

1. An integrated circuit (IC), comprising:
   a sampling circuit configured to receive, from an eye-scan controller, a sampling position signal and sample a first signal based on the sampling position signal to generate a sequence of sampled symbols;
   a data checker configured to provide, to the eye-scan controller, an error signal including an indication of one or more errors in the sequence of sampled symbols; and
   the eye-scan controller configured to:
      perform a left sweep process to sweep toward a left end of a unit interval of the first signal from an initial position to a left sweep end to generate a first sequence of sampling positions for the sampling position signal,
         wherein the left sweep end is determined based on a first sequence of BERs corresponding to the first sequence of sampling positions; and
      perform a right sweep process to sweep toward a right end of the unit interval from the initial position to a right sweep end to generate a second sequence of sampling positions for the sampling position signal,
         wherein the right sweep end is determined based on a second sequence of BERs corresponding to the second sequence of sampling positions.

2. The IC of claim 1, wherein the eye-scan controller is further configured to:
   determine the left sweep end based on a first determination that a difference between last two BERs of the first sequence of BERs is less than a first BER difference threshold.

3. The IC of claim 2, the eye-scan controller is further configured to:
   perform a first sub-sweep process to generate a first portion of the first sequence of sampling positions and a first portion of the first sequence of BERs by sweeping at least a portion between the initial position and a first sub-sweep end in a first step size; and perform a second sub-sweep process to generate a second portion of the first sequence of sampling positions and a second portion of the first sequence of BERs by sweeping from the first sub-sweep end to the left sweep end in a second step size different from the first step size.

4. The IC of claim 3, wherein the second step size is less than the first step size.

5. The IC of claim 3, wherein the eye-scan controller is further configured to:
  determine the first sub-sweep end in response to a second determination that a difference of last two BERs of the first portion of the first sequence of BERs is less than a second BER difference threshold.

6. The IC of claim 5, wherein the second BER difference threshold is greater than the first BER difference threshold.

7. The IC of claim 3, wherein the eye-scan controller is further configured to:
  prior to performing the first sub-sweep process, perform a third sub-sweep process to generate a third portion of the first sequence of sampling positions and a third portion of the first sequence of BERs by sweeping from the initial position to a third sub-sweep end located between the initial position and the first sub-sweep end,
  wherein the third sub-sweep end is determined in response to detecting a first BER in the third portion of the first sequence of BERs that is greater than zero, and
  wherein the first sub-sweep process sweeps from the third sub-sweep end to the first sub-sweep end.

8. The IC of claim 1, wherein the eye-scan controller is further configured to:
  generate one or more measurements of the first signal without using an oscilloscope located in a second IC different from the IC that includes the sampling circuit.

9. The IC of claim 8, further comprising:
  a pseudorandom binary sequence (PRBS) generator configured to generate a sequence of pseudorandom binary symbols; and
  a receiver configured to receive, through an input of the IC, the sequence of pseudorandom binary symbols and generate the first signal based on the received sequence of pseudorandom binary symbols;
  wherein the data checker is configured to generate the error signal by comparing the sequence of sampled symbols with the sequence of pseudorandom binary symbols.

10. The IC of claim 1, wherein the sampling circuit is configured to receive, from the eye-scan controller, a sampling amplitude signal and sample the first signal based on the sampling amplitude signal, and
  wherein the eye-scan controller is configured to:
  sweep vertically across an eye diagram associated with the first signal to generate a plurality of sampling amplitudes; and
  perform the left sweep process and the right sweep process for each sampling amplitude of the plurality of sampling amplitudes.

11. A method, comprising:
  providing, by a receiver circuit included in a first integrated circuit (IC), a first signal;
  determining, by an eye-scan controller included in the first IC, an initial position of a unit interval associated with the first signal;
  performing, by the eye-scan controller, a left sweep process, the left sweep process including:
    sweeping toward a left end of the unit interval from the initial position to a left sweep end to generate a first sequence of sampling positions;
    sampling the first signal based on the first sequence of sampling positions to generate a sampled symbol signal;
    generating a first sequence of bit error rates (BERs) corresponding to the first sequence of sampling positions based on the sampled symbol signal; and
    determining the left sweep end based on the first sequence of BERs;
  performing, by the eye-scan controller, a right sweep process, the right sweep process including:
    sweeping toward a right end of the unit interval from the initial position to a right sweep end to generate a second sequence of sampling positions;
    sampling the first signal based on the second sequence of sampling positions to generate the sampled symbol signal;
    generating a second sequence of BERs corresponding to the second sequence of sampling positions using the sampled symbol signal; and
    determining the second sweep end based on the second sequence of BERs.

12. The method of claim 11, wherein the performing the left sweep process includes:
  determining the left sweep end based on a first determination that a difference between last two BERs of the first sequence of BERs is less than a first BER difference threshold.

13. The method of claim 12, wherein the performing the left sweep process includes:
  performing a first sub-sweep process to generate a first portion of the first sequence of sampling positions and a first portion of the first sequence of BERs by sweeping at least a portion between the initial position and a first sub-sweep end in a first step size; and
  performing a second sub-sweep process to generate a second portion of the first sequence of sampling positions and a second portion of the first sequence of BERs by sweeping from the first sub-sweep end to the left sweep end in a second step size different from the first step size.

14. The method of claim 13, wherein the second step size is less than the first step size.

15. The method of claim 14, wherein the performing the first sub-sweep process includes:
  determining the first sub-sweep end in response to a second determination that a difference of last two BERs of the first portion of the first sequence of BERs is less than a second BER difference threshold.

16. The method of claim 15, wherein the second BER difference threshold is greater than the first BER difference threshold.

17. The method of claim 13, wherein the performing the left sweep process includes:
  prior to performing the first sub-sweep process, performing a third sub-sweep process to generate a third portion of the first sequence of sampling positions and a third portion of the first sequence of BERs by sweeping from the initial position to a third sub-sweep end located between the initial position and the first sub-sweep end,
  wherein the third sub-sweep end is determined in response to detecting a first BER in the third portion of the first sequence of BERs that is greater than zero, and wherein the first sub-sweep process sweeps from the third sub-sweep end to the first sub-sweep end.

18. The method of claim 11, further comprising:

generating, by the eye-scan controller, one or more measurements of the first signal without using an oscilloscope located in a second IC different from the first IC.

19. The method of claim 18, further comprising:

generating, by a pseudorandom binary sequence (PRBS) generator included in the first IC, a sequence of pseudorandom binary symbols;

receiving, by the receiver circuit through an input of the first IC, the sequence of pseudorandom binary symbols;

generating, by the receiver circuit, the first signal based on the received sequence of pseudorandom binary symbols;

receiving, from a data checker included in the first IC, an error signal generated by comparing the sequence of pseudorandom binary symbols and a sequence of sampled symbols included in the sampled symbol signal; and generating, by the eye-scan controller, the first sequence of BERs and the second sequence of BERs based on the error signal.

20. The method of claim 11, further comprising:

sweeping, by the eye-scan controller, vertically across an eye diagram associated with the first signal to generate a plurality of sampling amplitudes; and performing, by the eye-scan controller, the left sweep process and the right sweep process for each of the plurality of sampling amplitudes.

* * * * *